United States Patent [19]

Farley et al.

[11] 4,281,729
[45] Aug. 4, 1981

[54] MATERIAL WEIGHING AND BUCKET CHARGING APPARATUS

[76] Inventors: James E. Farley, 8832 Cupid Cir., North Canton, Ohio 44720; Irvin R. Scarborough, Rte. 3, Box 88A, Andrews, S.C. 29510

[21] Appl. No.: 68,913

[22] Filed: Aug. 23, 1979

[51] Int. Cl.³ .................... G01G 19/08; G01G 23/00; B67D 5/64
[52] U.S. Cl. ................................ 177/139; 177/162; 222/166
[58] Field of Search .............. 177/70, 139, 145, 146, 177/136, 162, 17; 222/164, 166, 57, 56

[56] References Cited
U.S. PATENT DOCUMENTS

| 616,355 | 12/1898 | Price | 222/166 |
| 823,914 | 6/1906 | Briggs | 222/166 |
| 3,858,672 | 1/1975 | Mrozek et al. | 177/136 |
| 4,114,706 | 9/1978 | Realini et al. | 177/70 |

Primary Examiner—George H. Miller, Jr.

[57] ABSTRACT

A tiltable hopper is supported on force transducers and has a chute which closes one end of the hopper in the raised position and bridges a space between the hopper and a material receiving bucket. Weight computing, recording and displaying means are coupled to the force transducers.

5 Claims, 4 Drawing Figures

MATERIAL WEIGHING AND BUCKET CHARGING APPARATUS

This invention relates to an apparatus for weighing incremental constituent materials and depositing said materials in a bucket for conveyance to a melting furnace.

A variety of grades or types of scrap or other raw materials are normally assembled to produce a metalic charge for a metal melting furnace such as an electric arc furnace. The qualiity of the metal produced and its cost depend on the proportion of each constituent in the total charge. This invention provides a means of accurately weighing each constituent and deliverying it to the charging bucket for conveyance to the furnace.

A common practice is to have an extended area for material storage. The furnace charging buckets are brought to the storage area on rail cars. They are then filled with the various constituents by mobile, overhead, or gantry type cranes using magnets, grabs, or other similar devices. The quantity of each constituent and the total charge is controlled by counting the number of crane lifts. Upon completion of the filling of the bucket, it is taken to the furnace area where it is removed from the rail car, weighed, and charged into the furnace. It is obvious that the amount of material in each lift may vary widely and result in large errors in the proportion of each constituent and in the total charge weight.

U.S. Pat. No. 3,227,231 shows and describes the loading of incremental constituent materials into a hopper where the materials are precisely weighed and then discharged downwardly into a charging bucket that is disposed on a conveyor for carrying the bucket from the hopper to the furnace. The apparatus described is very restrictive because of the limited range of the conveyor system used in transporting the charging buckets and because of the large height required for the equipment and runway for overhead cranes that charge material into the hopper.

An object of the invention is to provide a means of weighing each constituent and delivering it to a charging bucket, which, in turn, is transported to the melting furnace by means of rail cars.

An important restriction on any apparatus for charging materials into containers carried by rail cars is the requirement to maintain adequate horizontal and vertical clearances established by regulation between any fixed structure and the rail track. Another objective of the invention, therefore, is to achieve these clearance requirements in a unique manner.

Another objective of the invention is to record the weight of each constituent and the total weight of the material delivered to the bucket and to transmit this data to remote locations.

How these and other objectives and advantages of the invention are achieved will become apparent from the detailed description of the invention taken with the accompanying drawings in which.

Figure 4:
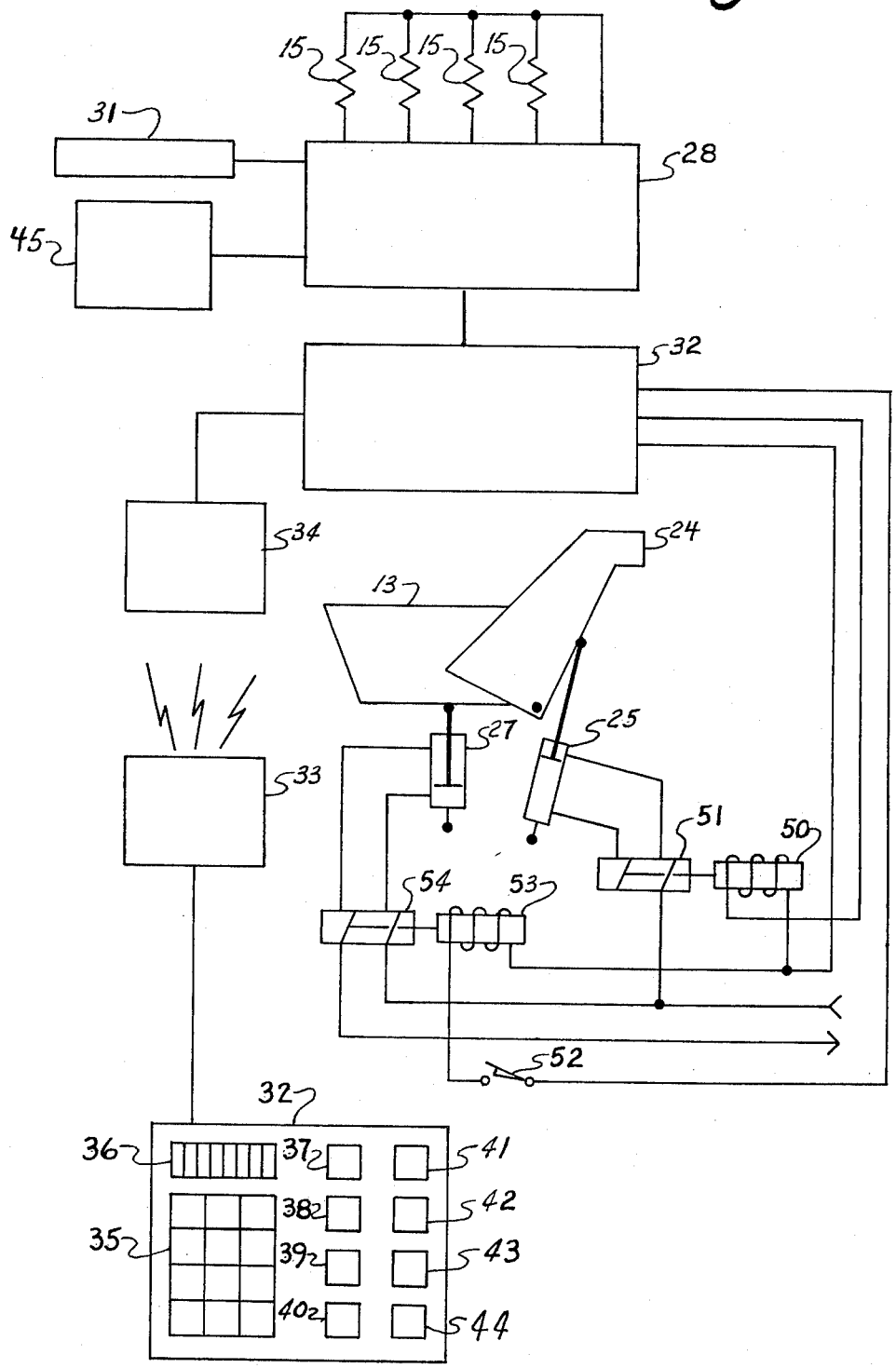

FIG. 4 schematically illustrates the functioning of the invention according to one embodiment.

Figure 1:
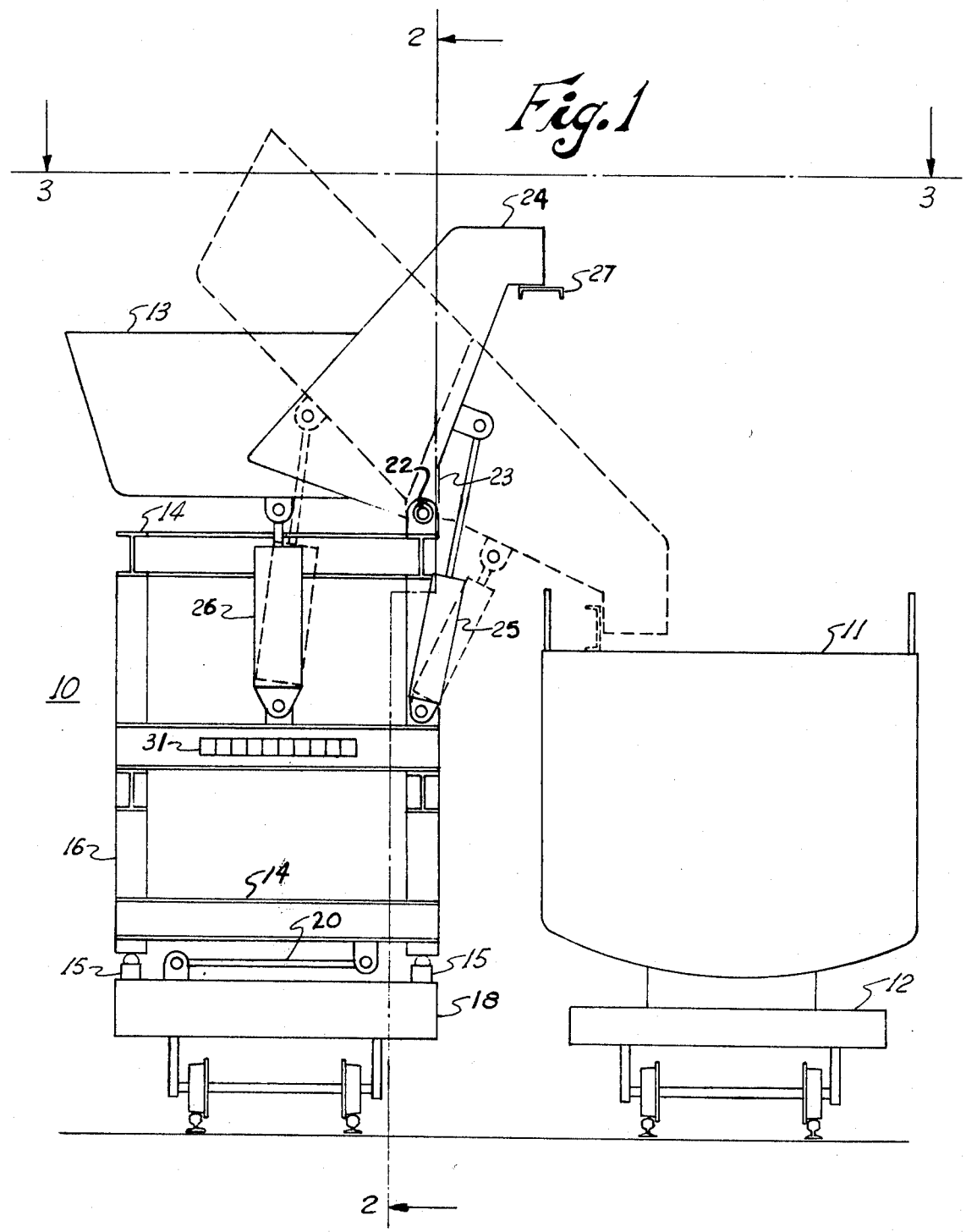
FIG. 1 is a side elevation view, with parts broken away, of the apparatus according to the instant invention.
Figure 2:
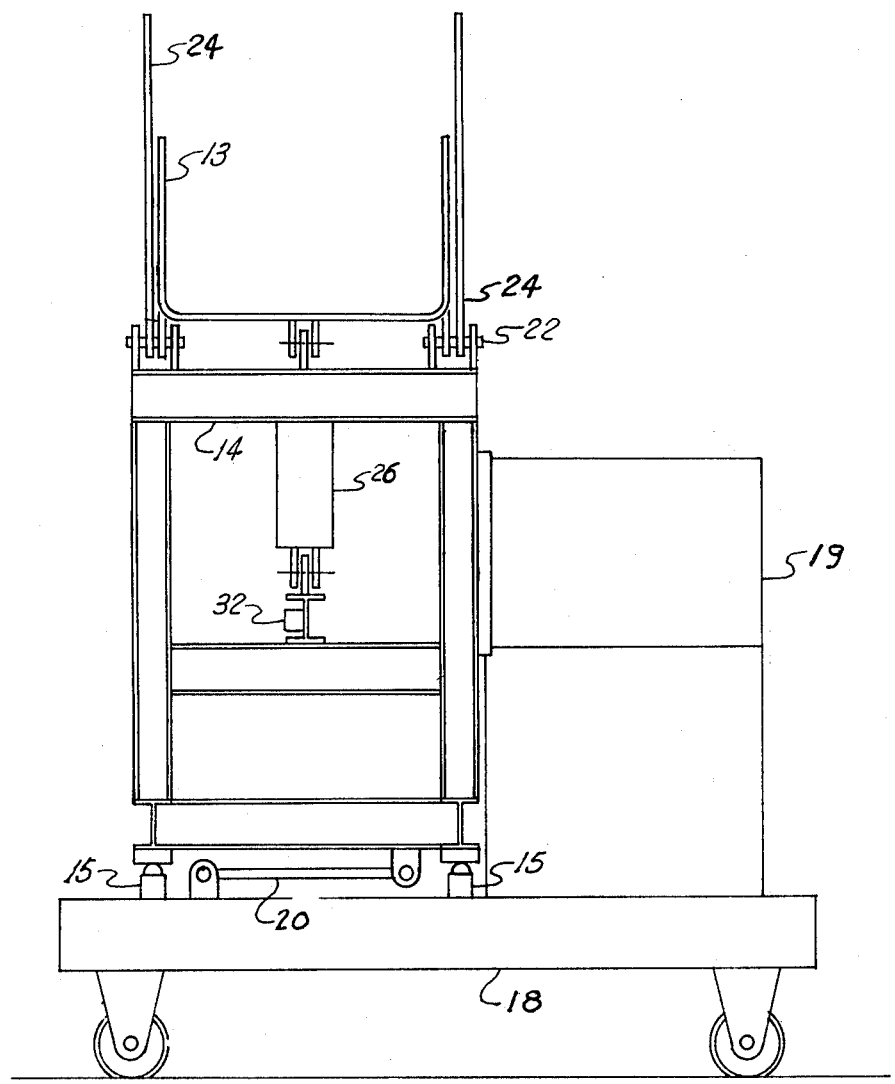
FIG. 2 is a view taken along lines 2—2 of FIG. 1.
Figure 3:
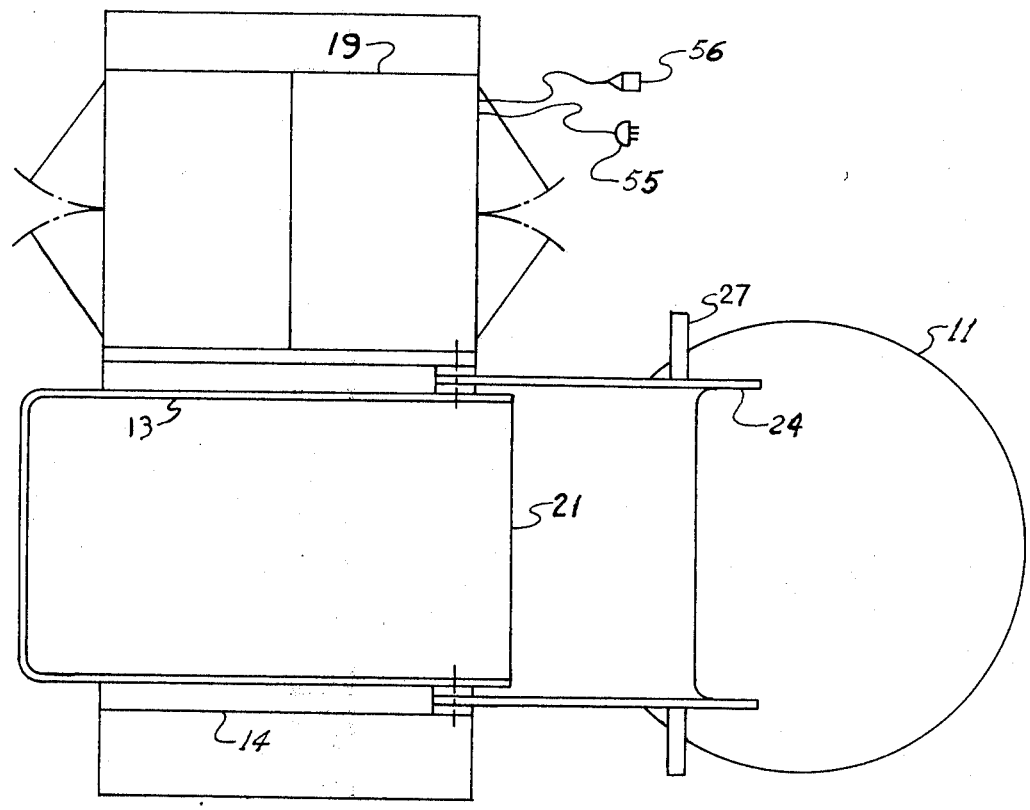
FIG. 3 is a plan view taken along lines 3—3 of FIG. 1.

With particular reference to FIGS. 1-3 of the drawing, there is shown a weighing apparatus 10 that is designed to receive and weigh the charged material; and then deliver the weighed material to a conventional charge bucket 11, which is mounted atop the flat bed of a rail car 12 that is movable along a fixed trackway to transport the charge bucket to a melting furnace which is located remote from the weighing apparatus 10.

The weighing apparatus 10 includes a tilting hopper 13 which is mounted on a rigid frame 14 that is supported on a plurality of force transducers 15 which are best located under columns of the rigid frame 14. In this instance, the force transducers 15 are mounted atop the flat bed of a rail car 18 that is movable along a fixed trackway which passes through an extended material storage area. The rail car 18 is provided with an enclosure 19 to house and protect the various devices used in weighing material charged to the hopper 13, as will be hereinafter explained. Thus, the weighing apparatus 10 is portable, although in some cases, it may be more advantageous to provide a fixed, rather than a portable weighing apparatus 10. Stabalizers 20 are coupled between the flat bed of the rail car 18 and the rigid frame 14 to restrain movement of the frame 14 so that the vertical weight of the weighing apparatus 10 is supported solely by the force transducers 15 in accordance with weighing techniques that are well known to those skilled in the art.

The tilting hopper 13 has an open end 21, closest the charge bucket 11, which is pivotally mounted on a pair of bushings 22 that are secured in spaced relation to the top of the rigid frame 14. A chute 24 is pivotally mounted on the bushings 22 and used to close up the open end 21 of the hopper 13. A hydraulic cyliner 25 is coupled between the rigid frame 14 and chute 24 to raise and lower the chute 24 to and from an adjacent charge bucket 11. A hydraulic cylinder 26 is coupled between the rigid frame 14 and hopper 13 to tilt the hopper 13 independently of the chute 24, so that material in the hopper can be discharged into the chute 24 for passage into the charge bucket 11. The chute 24 is equipped on its outboard end with a beam 27 that acts as a rest on the charge bucket 11 and supports the outboard end of the chute as material exits the tilted hopper for passage through the chute into the charge bucket. The beam further acts to restrain displacement of the charge bucket upon impact of the material as it charges into the bucket. The tilting hopper and chute are shown in solid line in their retracted or loading position for receiving the charged material, and in dotted line in their tilted and lowered position for discharging the material into the bucket.

In operation, the charge buckets 11 are brought alongside the weighing apparatus 10 on rail cars 12 and aligned with the hopper 13. Conventional mobile cranes charge material in small increments or lifts into the hopper 13 until the hopper is filled with the desired amount of material. The chute 24 and hopper 13 are then tilted to discharge the material into the charge bucket 11 for transport to the melting furnace.

The increasing weight of the added material changes the output signal of the force transducers 15 which may be of any well known type such as strain gage load cells, or magnetostrictive devices that produce a resistance or signal proportional to the weight on the transducers. The transducers 15, as best seen in FIG. 4, are connected to a weight computer 28, which functions to sum the signals from the force transducers to produce a signal proportional to the total weight on the transducers. The weight computer 28 is designed to retain the signal measurement proportional to the weight of the structure without load, or tare weight, and subtract this value from the loaded weight signal to produce an electrical signal which corresponds to the weight of the charged material only. The material charged weight signal is converted to a digital electrical signal and the weight can be observed by the charging crane operator.

The charging crane or other such equipment must be free to move, thereby making it impractical to have a physical electrical connection between the charging equipment and the weighing station 10. Communication is maintained between the weighing apparatus 10 and the charging equipment by means of a control station 32 which is installed in the charging equipment and connected to a ratio control transmitter 33 by which coded signals generated by the control unit 32 are transmitted by radio signals to a radio control receiver 34 that is located in the weighing apparatus 10. The radio control receiver 34 converts the coded radio signals to electrical signals that are transmitted to the control unit 32 which initiates the various desired control functions of the weighing apparatus 10 in response to the electrical signals.

To meet the requirements of a typical installation, the control unit 32 may include, but certainly is not limited to, digital keyboard 35 to enter numerical data; a digital readout 36 to display such data; coding pushbuttons to code data being entered, including material grade 37 and bucket identity 38; function pushbuttons including (a) ENTER 39 to cause the aforementioned coded data to be entered into the memory of the weight computer 28, (b) CLEAR 40 to cancel data or code information, (c) TOTAL 41 to cause the total accumulated weight to be shown on the digital display 31, on the weighing apparatus 10, (d) EMPTY 42 to cause the chute 24 to lower and the hopper 13 to raise to transfer the material from the hopper to the charge bucket 11, (e) RETURN 43 to cause the hopper 13 and the chute 24 to return to the loading positon, (f) COMPLETE 44 to cause the information that the bucket charge is complete to be registered in the weight computer 30 and for the total charge data to be transmitted to a remote data station 45.

The control unit 28 comprises electrical devices and circuitry to cause all the weighting and material transfer functions to be executed in the necessary sequence in response to signals from the weight computer 28 and such other sensors or devices required for a complete functioning system.

The equipment used to execute the empty cycle includes a solenoid 50 which in response to an EMPTY 42 signal is energized to cause operation of a valve 51 which in turn, controls the flow of hydraulic fluid from an hydraulic system (not shown) to the hydraulic cylinder 25 to lower chute 24. The chute 24 upon reaching its lower most position, actuates a limit switch 52 which causes energization of a solenoid 53 which operates a valve 54 to direct hydraulic fluid to the hydraulic cylinder 25 to tilt the hopper 13 to discharge any material contained therein into an adjacent charge bucket 11. The RETURN 43 signal reverses the process by returning the hopper 13 and chute 22 to the loading position.

The foregoing description of the execution of the weighing, recording and material transfer functions of the invention describes one embodiment of equipment to achieve these objectives. It will be understood by those skilled in the art of electronic weighing, computing, data transmission and electrical control that a variety of techniques may be employed to achieve these objectives.

As previously indicated, the portable embodiment of the weighing apparatus 10 as best seen in FIG. 2, includes an enclosure 19 to house and protect the hydraulic system (not shown), the weight computer 30, the control unit 32, and the radio control receiver 34. A portable power connection 55 and a data cable connection 56 may also be provided, such connections being for the purpose of being able to supply electrical power and data transmission connections at a multiplicity of positions in which the weighing apparatus 10 can be located.

While one embodiment has been shown and described, it is obvious that many other embodiments are possible. The embodiment described provides features which enable the weighing apparatus to be portable. A multiplicity of similar stationary apparatuses in fixed locations could, in some instances, eliminate the need for a single portability apparatus.

We claim that:

1. In combination: A tiltable hopper supported on a plurality of force transducers for measuring the weight of the hopper and any material charged thereto; a chute designed to close the end of the tiltable hopper in the raised position and to bridge the horizontal space between the hopper and a material receiving bucket laterally disposed thereto in the lowered position; means of supporting the outboard end of the chute and simultaneously restraining the receiving bucket from movement; electromotive means of raising and lowering the chute; electromotive means of tilting the hopper; weight computing, recording and displaying means coupled to the force transducers; means of simultaneously causing the weight of the material in the hopper and coded data corresponding to the type of material to be registered in the weight computer memory, the chute to lower, the hopper to tilt and to return the hopper and chute to their load positions when emptied; wireless control means of initiating the functions of weight and coded data registration and empty and return functions from a remote location; means of transmitting the material weight and coded data to a remote data processing terminal; means of readily moving the weighing apparatus to a multiplicity of operating locations.

2. In combination: A tiltable hopper supported on a plurality of force transducers for measuring the weight of the hopper and any material charged thereto; a chute designed to close the end of the tiltable hopper in the raised position and to bridge the horizontal space between the hopper and a material receiving bucket laterally disposed thereto in the lowered position; means of supporting the outboard end of the chute and simultaneously restraining the receiving bucket from movement; electromotive means of raising and lowering the chute; electromotive means of tilting the hopper; weight computing, recording and displaying means coupled to the force transducers; means of simultaneously causing the weight of the material in the hopper and coded data corresponding to the type of material to be registered in the weight computer memory, the chute to lower, the hopper to tilt and to return the hopper and chute to their load positions when emptied; wireless control means of initiating the functions of weight and coded data registration and empty and return functions from a remote location; means of transmitting the material weight and coded data to a remote data processing terminal.

3. In combination: A tiltable hopper supported on a plurality of force transducers for measuring the weight of the hopper and any material charged thereto; a chute designed to close the end of the tiltable hopper in the raised position and to bridge the horizontal space between the hopper and a material receiving bucket laterally disposed thereto in the lowered position; means of supporting the outboard end of the chute and simultaneously restraining the receiving bucket from movement; electromotive means of raising and lowering the chute; electromotive means of tilting the hopper; weight computing, recording and displaying means coupled to the force transducers; means of simultaneously causing the weight of the material in the hopper and coded data corresponding to the type of material to be registered in the weight computer memory, the chute to lower, the hopper to tilt and to return the hopper and chute to their load positions when emptied; control means of initiating the functions of weight and coded data registration and empty and return functions; means of transmitting the material weight and coded data to a remote data processing terminal.

4. In combination: A tiltable hopper supported on a plurality of force transducers for measuring the weight of the hopper and any material charged thereto; a chute designed to close the end of the tiltable hopper in the raised position and to bridge the horizontal space between the hopper and a material receiving bucket laterally disposed thereto in the lowered position; means of supporting the outboard end of the chute and simultaneously restraining the receiving bucket from movement; electromotive means of raising and lowering the chute; electromotive means of tilting the hopper; weight computing, recording and displaying means coupled to the force transducers; means of simultaneously causing the weight of the material in the hopper and coded data corresponding to the type of material to be registered in the weight computer memory, the chute to lower, the hopper to tilt and to return the hopper and chute to their load positions when emptied; control means of initiating the functions of weight and coded data registration and empty and return functions.

5. In combination: A tiltable hopper supported on a plurality of force transducers for measuring the weight of the hopper and any material charged thereto; a chute designed to close the end of the tiltable hopper in the raised position and to bridge the horizontal space between the hopper and a material receiving bucket laterally disposed thereto in the lowered position; means of supporting the outboard end of the chute and simultaneously restraining the receiving bucket from movement; electromotive means of raising and lowering the chute; electromotive means of tilting the hopper; weight computing, recording and displaying means coupled to the force transducers.

* * * * *